(12) United States Patent
Burch et al.

(10) Patent No.: US 11,328,108 B2
(45) Date of Patent: May 10, 2022

(54) PREDICTING DIE SUSCEPTIBLE TO EARLY LIFETIME FAILURE

(71) Applicant: PDF Solutions, Inc., Santa Clara, CA (US)

(72) Inventors: Richard Burch, McKinney, TX (US); Qing Zhu, Rowlett, TX (US); Keith Arnold, Austin, TX (US)

(73) Assignee: PDF Solutions, Inc., Santa Clara, CA (US)

( * ) Notice: Subject to any disclaimer, the term of this patent is extended or adjusted under 35 U.S.C. 154(b) by 0 days.

(21) Appl. No.: 17/189,621

(22) Filed: Mar. 2, 2021

(65) Prior Publication Data

US 2021/0279388 A1 Sep. 9, 2021

Related U.S. Application Data

(60) Provisional application No. 62/984,337, filed on Mar. 3, 2020.

(51) Int. Cl.
*G06F 30/27* (2020.01)
*G06F 119/02* (2020.01)
*G06F 119/22* (2020.01)

(52) U.S. Cl.
CPC .......... *G06F 30/27* (2020.01); *G06F 2119/02* (2020.01); *G06F 2119/22* (2020.01)

(58) Field of Classification Search
CPC ....................................................... G06F 30/27

USPC ........................................................ 716/56
See application file for complete search history.

(56) References Cited

U.S. PATENT DOCUMENTS

| | | |
|---|---|---|
| 2004/0121495 A1 | 6/2004 | Sonderman et al. |
| 2012/0136629 A1 | 5/2012 | Tamaki et al. |
| 2016/0148850 A1 | 5/2016 | David |
| 2017/0176983 A1 | 6/2017 | Tetiker et al. |
| 2020/0051235 A1 | 2/2020 | Majumdar et al. |
| 2020/0103761 A1* | 4/2020 | Ypma .................. G03F 7/70658 |

OTHER PUBLICATIONS

International Search Report and Written Opinion of the ISA, dated May 7, 2021.

* cited by examiner

*Primary Examiner* — Eric D Lee
(74) *Attorney, Agent, or Firm* — Dergosits & Noah LLP

(57) ABSTRACT

Semiconductor yield is modeled at the die level to predict die that are susceptible to early lifetime failure (ELF). A first die yield calculation is made from parametric data obtained from wafer testing in a semiconductor manufacturing process. A second die yield calculation is made from die location only. The difference between the first die yield calculation and the second die yield calculation is a prediction delta. Based on an evaluation of the first die yield calculation and the prediction delta, the likelihood of early lifetime failure can be identified and an acceptable level of die loss can be established to remove die from further processing.

15 Claims, 5 Drawing Sheets

PREDICTING DIE SUSCEPTIBLE TO EARLY LIFETIME FAILURE

CROSS REFERENCE

This application claims priority from U.S. Provisional Application No. 62/984,337 entitled Modeling Yield to Predict Die Susceptible to Early Lifetime Failure (ELF), filed Mar. 3, 2020, and incorporated herein by reference in its entirety.

TECHNICAL FIELD

This application relates to semiconductor manufacturing processes, and more particularly, to systems and methods for predicting die that are susceptible to early lifetime failure.

BACKGROUND

The cost of an electronic chip failing in the field is extremely high when compared to the cost incurred by discarding a chip before packaging and shipping. Current methods to identify chips that are likely to fail have focused on heuristics to identify a chip that might be bad and/or expensive stress testing (often called burn-in) to induce failures before shipping.

Direct modeling of field failures is extremely difficult as a practical matter due to the relatively small number of field failures in general, and the even smaller number of field failures that are returned to the maker and which can be traced back to their original lot and wafer. Thus, any method that can identify a significant proportion of die that are likely to fail earlier in the product chain can be very valuable. We refer to these early field failures as Early Lifetime Failures or ELFs.

DETAILED DESCRIPTION

Figure 1:
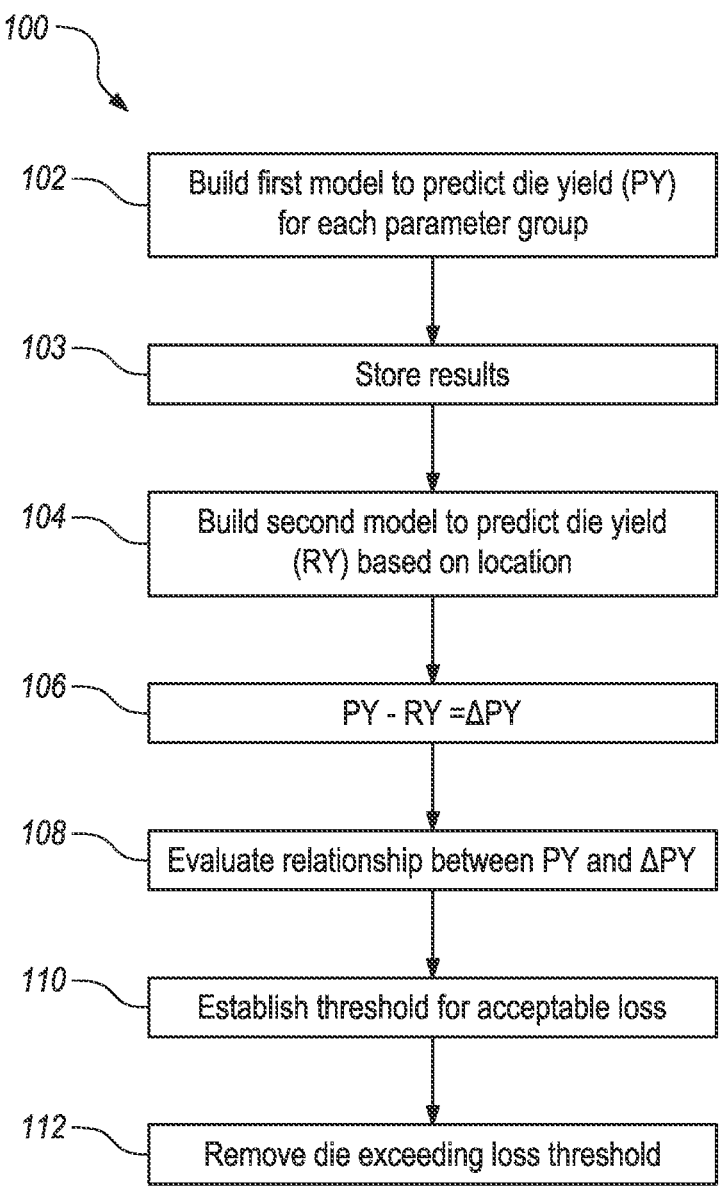
FIG. 1 is a flow chart illustrating a process for modeling die-level yield to predict early lifetime failure.

This disclosure is directed to a method and systems for modeling yield at the die level to predict die that are susceptible to early lifetime failure (ELF) based primarily on parametric data obtained from the wafer test and sort step in a semiconductor manufacturing process. The modeled yield method described herein has been shown to provide significantly improved predictive capability on a large data set with a limited number of known field returns.

Effective die-level yield models have proven very challenging to achieve in modern semiconductor processing since the correlations between parametric data and yield are highly non-linear and can be strongly multivariate. The evaluation of this problem is facilitated by the emergence of parallel processing architectures and the advancement of machine learning algorithms which allow users to model these type of correlations better than ever before. The field of machine learning is a branch of artificial intelligence that involves the construction and study of systems that can learn from data. These types of algorithms, along with parallel processing capabilities, allow for much larger datasets to be processed, and are much better suited for multivariate analysis.

Modern machine learning technologies can be used to configure algorithmic-based software models that learn the complex non-linear relationships, initially from training sets of data, and updated from newly acquired data, to better understand the relationships among the input parameters. For example, a neural network is an example of an implementation of a machine learning model, and XGBoost is another machine learning model based on extremely complex tree models. The processor-based models could be desktop-based, i.e., standalone or part of a networked system, and should preferably be implemented with current state-of-the-art hardware and processor capabilities (CPU, RAM, OS, etc.). A Python object-oriented programming language can be used for coding machine language models, and program instruction sets can be stored on computer-readable media.

Fabrication is the major step in a typical semiconductor manufacturing process, wherein a large number of integrated circuits are formed on a single slice or wafer of semiconductor substrate, such as silicon, through multiple steps and different processing techniques over a period of time (e.g., months). After fabrication, the wafers are tested and sorted. Initially, a small set of structures formed in the scribe lines of the wafer may be tested, for example, to make sure that $V_t$ or other voltage or current levels are within range across the wafer, or that contact resistance or other electrical properties are within specifications. For wafers that are shipped to a customer facility for packaging, the scribe line structure tests must typically meet customer criteria for the wafers.

After testing the scribe line structures, and before dicing up the wafer into individual dies, each integrated circuit formed on a die is subject to a variety of further tests. Functional testing typically involves applying test patterns to individual circuits using a circuit probe, and if the expected digital output is detected, the circuit passes; if not, the circuit fails. Other tests are parametric in nature, obtaining numerical values as responses for parametric tests of, e.g., ring oscillator frequencies, current/voltage values for a particular size transistor, etc. Generally, if the numerical parametric value is greater than or less than a threshold or limit, then even if the chip functions, it is viewed as non-viable and fails because of the parametric value. Circuits that fail the testing procedure may be discarded (or marked for destruction once the wafer is diced), and the status of the circuits can be marked or otherwise identified, for example, stored in a file that represents a wafer map. However, the present modeling methods can utilize the wafer sort testing data for all die, pass or fail, in forming more effective predictions. After wafer testing and sort, the wafer is diced up into its individual circuits or dies, and each die that passes wafer test/sort is packaged.

Although our focus here is on parametric testing data from the wafer sort process step, other available data could be used in any modeling step, and the techniques readily extended to include data from the scribe line structures, front-end data from fabrication, or back-end data from packaging/shipping, to improve the scheme for identifying die that are likely to fail.

Referring now to FIG. 1, a simplified process 100 for modeling yield to predict die susceptible to early lifetime failure is illustrated. In step 102, a first machine learning model is configured to predict yield for each die, i.e., determine the likelihood that a particular die is good, based (at least initially) on all the data from all the die in a grouping of parameters that appear together with the particular die in testing that has passed all the die in the group. Inputs to the first model are the location of the die, the wafer sort parametric values, and any other available data (e.g., from fabrication or packaging steps). The first model analyzes the input data and decides which inputs are more important in predicting yield, then finalizes the model for parametric yield prediction (PY) for each die based only on the more important input data, and stores the resultant prediction PY in step 103.

In step 104, a second machine learning model is configured to predict yield for each die based only on the location of the die. This result is the reference yield (RY) prediction for each die. In general, locations closer to the edge are more likely to result in failing die while locations closer to the center more typically result in passing die. In step 106, the reference yield prediction RY is subtracted from the parametric yield prediction PY and the result is a parametric yield delta (ΔPY).

Analysis and evaluation of the relationship between the parametric yield prediction PY and the parametric yield delta ΔPY in step 108 can lead to an action plan for a customer to establish an acceptable loss threshold in step 110; that is, what percentage of die is the customer willing to remove in step 112 from further processing based on the modeled yield prediction for early lifetime failure. Thus, the modeled yield approach to predicting die yield has proven to be more effective at identifying die that are susceptible to failure than conventional methods. Further, by removing die that have a significant likelihood of early failure in the field prior to packaging, overall yield and cost performance are improved.

Figure 2:
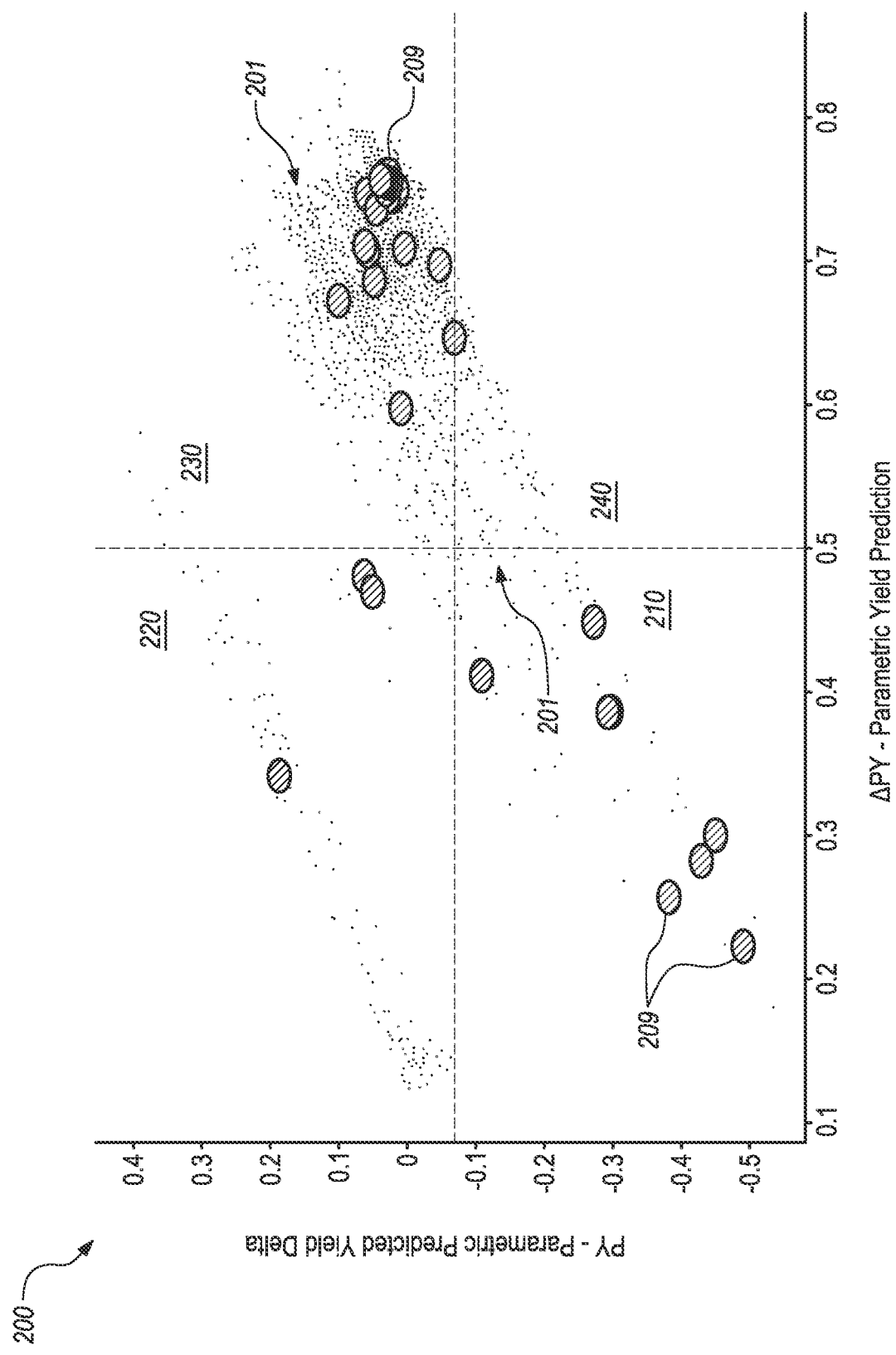
FIG. 2 is a graph of parametric yield prediction versus parametric prediction yield.

For example, FIG. 2 is a graphical plot 200 of the parametric yield prediction PY on the x-axis and the parametric yield delta ΔPY on the y-axis for an actual sampling of wafer sort and test parametric data for more than 12,000 die indicated by symbols 201. Die that have been identified as field returns are indicated by symbols 209.

From a sampling of actual data subjected to the improved method described herein, 77 die returned test results located in quadrant 210 of plot 200, indicating a low PY and a negative ΔPY. Further, there were 8 field returns of bad die that tested in quadrant 210, which indicates that at least 10.4% of the die that tested in quadrant 210 were bad, far and away the largest numerical result. Since it is likely that all die that fail in the field are not returned, the actual percentage of bad die in quadrant 210 is likely higher. 144 die returned test results located in quadrant 220 of plot 200, indicating a low PY and a positive ΔPY. Of these die, 3 were field returns of bad die, a 2.1% fail rate, also a significant number.

11,946 die returned test results located in quadrant 230 of plot 200, indicating a high PY and a positive ΔPY. 34 die were field returns, a 0.3% failure rate. Finally, 150 die returned test results located in quadrant 240 of plot 200, indicating a high PY and a negative ΔPY. Only 1 die was a field return in this quadrant, a 0.7% failure rate.

It is apparent from FIG. 2 that the highest likelihood that processing results in early lifetime failures of die occurs when the modeled yield methods indicate both a low PY and a large negative ΔPY. However, it is also apparent that either a low PY or large negative ΔPY can also indicate increased probability of earlier lifetime failure. It should also be recognized that many early lifetime failures cannot be predicted in this manner since some failures are due to packaging issues or random defects.

Figure 3:
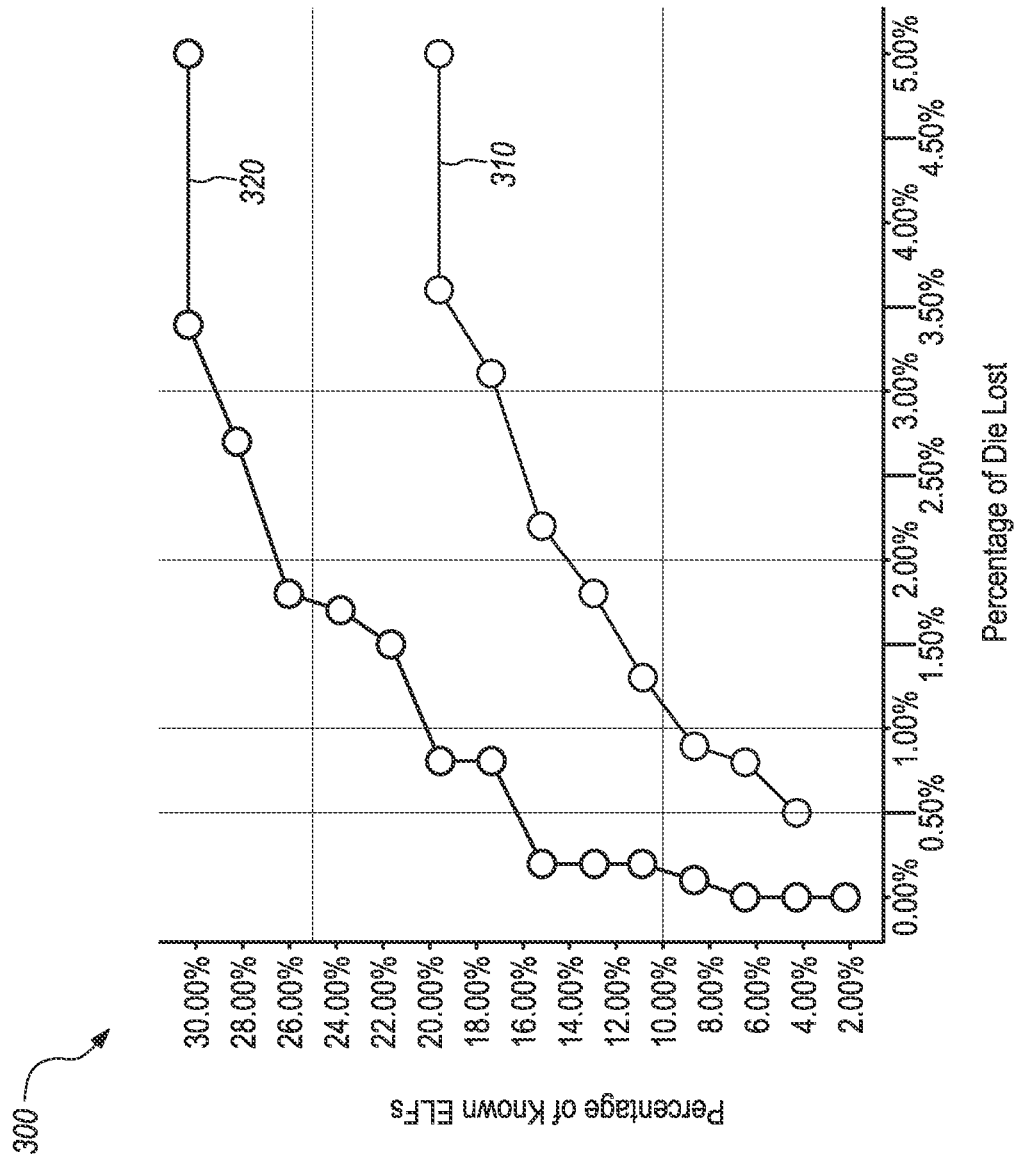
FIG. 3 is a graph of percentage die lost versus percentage of early lifetime failures.

The graphical plot 300 of FIG. 3 illustrates the comparison between a conventional method for identifying outliers to predict yield, indicated by line 310, and the modeled yield method for predicting early lifetime failures, indicated by line 320. The x-axis indicates the percentage of good die sacrificed to reduce field returns and the y-axis indicates the percentage of early lifetime failures known from the prediction method. Thus, the graph 300 shows an improvement of 10% or more in the ability to identify early lifetime failures with the modeled yield approach for this data set, a significant and valuable improvement.

Given such information, a customer can make choices about how much risk of die failure is acceptable. For example, a customer with a high-reliability application (such as avionics) would have a very low tolerance for field failures, while a more cost-conscious customer may have a higher tolerance for failures.

Figure 4:
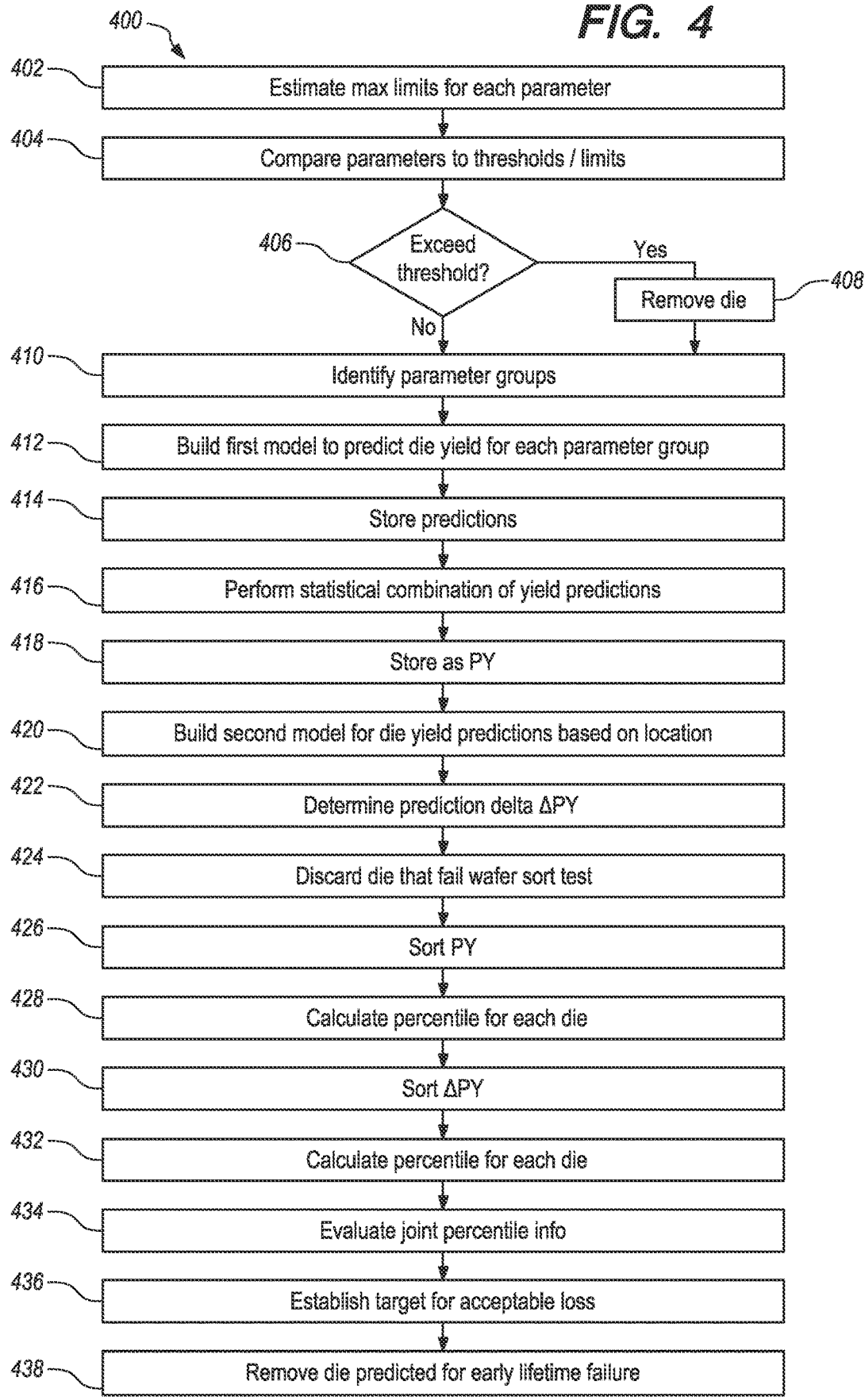
FIG. 4 is a flow chart illustrating additional detail of the process of FIG. 1.

Referring now to FIG. 4, a more detailed process flow 400 for modeled yield predictions at the die level is presented. In step 402, a maximum limit is estimated for each die-relevant parameter. Although there may be thousands of such parameters for each unique die design, each parameter has a value at which the die will always fail, and those limits are considered first. Typically, a customer will provide data for its list of parameters and a threshold value or customer limit for each parameter. However, for the purposes of modeling, it may be more effective if the limit or threshold for each parameter is determined independently from the customer data. For example, in one embodiment, the maximum limit is taken from a review of the customer data as the largest value of any die that yields, while all larger values consistently result in failing the die. In step 404, the parameters for each die are compared to thresholds based on the estimated limits, and if any die exceeds the threshold for any parameter in step 406, it is removed or marked for removal in step 408 to avoid further processing.

Next, in step 410, groups of parameters that always appear together in the testing results are identified. More specifically, a parameter group is one in which a group of passing die all have testing values for the same parameters as a result of a wafer sort and testing procedure. The parameter groups can be non-exclusive.

Figure 5:
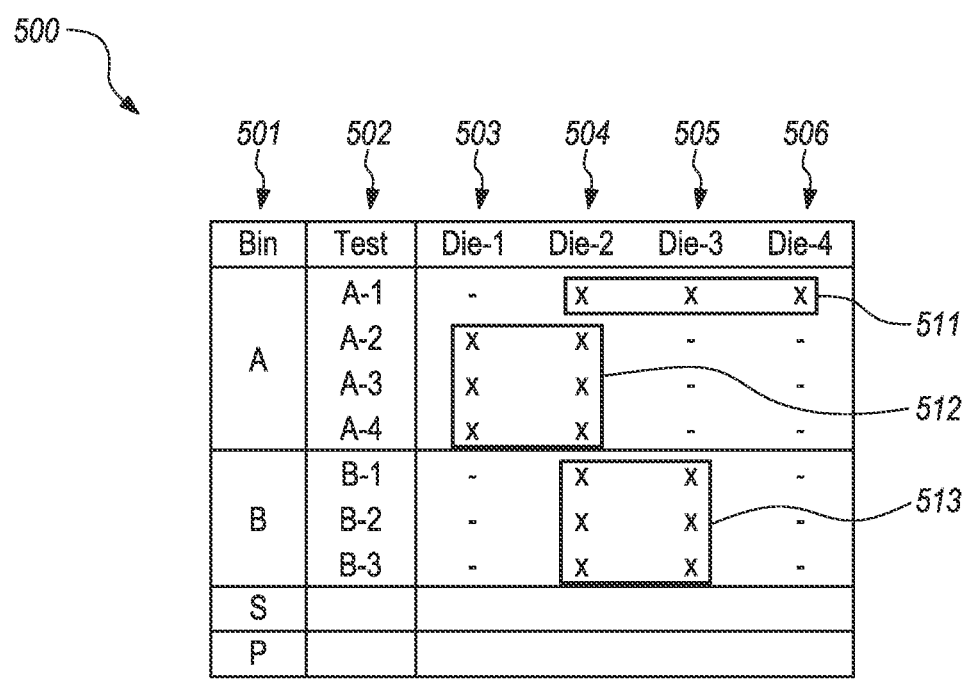
FIG. 5 is a table illustrating how to identify parameter groups.

For example, referring now to FIG. 5, table 500 provides an example to illustrate identifying parameter groups. The first column 501 lists the bin into which die have been classified according the results from wafer test/sort. The second column 502 lists the specific parametric test performed, including tests A1-A4 and B1-B3. Columns 503-506 indicate whether a parameter data value has been returned for the respective test in that row. It can be seen that the parameters of tests A1 are present in Die2, Die3 and Die4, thus forming a first parameter group 511. It can be further seen that the parameters of tests A2-A4 are present in Die1 and Die2 thus forming a second parameter group 512. Finally, the parameters of tests B1-B3 are present in Die2 and Die3 thus forming a third parameter group 513.

Returning to FIG. 4, once the parameter groups have been identified, a first machine learning model is built in step 412 as a cross-validated model for determining a yield prediction for each identified parameter group. In one embodiment, the first model is run for each parameter group using data from all die that show values for all parameters in that parameter group. In step 414, the yield prediction from the first model is stored and saved for each die in the parameter group.

In step 416, the yield predictions across all parameter groups to which the particular die belongs are combined, for example, as a statistical function. In one embodiment, the average is taken across all yield predictions for the die and stored and saved as the parametric yield prediction PY in step 418.

A second machine learning model is built in step 420 for reference yield prediction. The result is determined by computing the yield prediction for each individual die based solely on the location of the die on the wafer. In one embodiment, polar coordinates are used to provide a smoother modeling result.

A parametric yield prediction delta ΔPY is calculated in step 422 by subtracting the reference yield prediction RY (step 420) from the parametric yield prediction PY (step 418). A negative delta is undesirable because it means that the reference yield prediction is higher than the parametric yield prediction.

In step 424, after all predictions have been determined, any die that failed wafer sort testing are discarded thereby limiting the remaining die to be analyzed. The die that fail wafer sort testing cannot be early lifetime failures since they would never be shipped or even packaged.

The parametric yield predictions PY are sorted from lowest to highest in step 426, and the applicable predicted yield PY percentile of each die is calculated in step 428. Similarly, the parametric yield prediction deltas ≠PY are sorted from lowest to highest in step 430, and the applicable percentile ΔPY of each die is calculated in step 432. By evaluating this joint percentile information in step 434, a target for acceptable loss can be established in step 436, and die in the target region(s) predicted for early lifetime failure removed from further processing in step 438. In general, the minimum of the PY percentile and the ΔPY percentile is the primary indicator of the likelihood for the die to be an early lifetime failure. Thus, a customer can establish its tolerance for some level of loss and establish a policy to remove selected die that have a likelihood of early lifetime failure meeting a PY percentile criteria and/or a ΔPY percentile criteria.

The foregoing written description is intended to enable one of ordinary skill to make and use the techniques described herein, but those of ordinary skill will understand that the description is not limiting and will also appreciate the existence of variations, combinations, and equivalents of the specific embodiments, methods, and examples described herein.

The invention claimed is:

1. A method, comprising:
predicting a first yield value for each of a first plurality of die in a first identified parameter group using a first machine learning model configured to predict the first yield value using data values obtained from parametric testing of a semiconductor wafer on which the first plurality of die are formed, each of the first plurality of die having data values for each of a plurality of parameters in the first identified parameter group;
assigning each of the first predicted yield values to respective ones of the first plurality of die;
predicting a second yield value for each of the first plurality of die in the first parameter group using a second machine learning model configured to predict respective second yield values using a location of corresponding ones of the first plurality of die;
determining a prediction delta for each of the first plurality of die by subtracting respective predicted second yield values from respective predicted first yield values;
establishing a threshold for acceptable die loss based on a relationship between the respective predicted first yield values and respective prediction deltas; and
removing a portion of the first plurality of die from further processing in accordance with the threshold for acceptable die loss.

2. The method of claim 1, further comprising:
predicting the first yield value for additional pluralities of die, each additional plurality of die organized into one of a plurality respective parameter groups, each of the additional pluralities of die having data values for each of a plurality of parameters in each of the respective parameter groups; and
predicting the second yield value for each of the additional pluralities of die in respective parameter groups using a location of each die.

3. The method of claim 1, further comprising:
identifying a plurality of parameter groups, each identified parameter group including a respective plurality of die each having data values for each of a plurality of parameters in the identified parameter group;
predicting the first yield value for each of the respective plurality of die in each identified parameter group; and
predicting the second yield value for each of the respective plurality of die in each identified parameter group using a location of each die.

4. The method of claim 1, further comprising:
estimating a maximum limit, respectively, for each of the plurality of parameters;
for each die, comparing each of the plurality of parameters to the respective maximum limit;
removing die having a parameter that exceeds the respective maximum limit.

5. The method of claim 1, further comprising:
evaluating the relationship between respective predicted first yield values and respective prediction deltas in order to establish the threshold value.

6. The method of claim 5, further comprising:
sorting the predicted first yield values from lowest to highest;
calculating a yield percentile of the predicted first yield value associated with each of the first plurality of die;
sorting the prediction deltas from lowest to highest;
calculating a delta percentile of respective prediction deltas associated with each of the first plurality of die; and
identifying a minimum percentile value as between the yield percentile and the delta percentile;
selecting the minimum percentile value as the threshold value.

7. The method of claim 5, further comprising:
setting the threshold for acceptable die loss for a condition when the predicted first yield value is less than a defined limit and when the prediction delta is a negative value.

8. The method of claim 5, further comprising:
setting the threshold for acceptable die loss for a condition when the predicted first yield value is less than a defined limit and when the prediction delta is a positive value.

9. The method of claim 1, wherein the first machine learning model is further configured using data obtained from fabrication processing of the semiconductor wafer.

10. The method of claim 1, wherein the first machine learning model is further configured using data obtained from packaging of the semiconductor wafer.

11. A method, comprising:
  receiving a plurality of data values obtained from a semiconductor process configured to fabricate a first plurality of unique die on a semiconductor wafer;
  identifying a subset of the data values that are always present in testing results for passing die;
  predicting a first yield value for each one of the first plurality of die formed on the basis of the subset of data values;
  predicting a second yield value for each one of the first plurality of die on the basis of a location of each one of the first plurality of die;
  subtracting respective predicted second yield values from respective predicted first yield values to obtain a plurality of respective prediction deltas;
  establishing a threshold for acceptable die loss based on a relationship between the respective predicted first yield values and respective prediction deltas; and
  removing any of the first plurality of die that exceed the threshold from further processing.

12. The method of claim 11, further comprising:
  establishing the threshold to avoid a low predicted first yield or a large negative prediction delta.

13. The method of claim 11, further comprising:
  establishing the threshold to avoid a low predicted first yield and a large negative prediction delta.

14. The method of claim 11, further comprising:
  establishing a maximum limit for each of the subset of data values;
  for each die, each of the subset of data values to the respective maximum limit; and
  removing any die having a data value that exceeds the respective maximum limit.

15. A predictive model, comprising at least one processor configured to:
  predict a first yield value for each of a first plurality of die in a first identified parameter group using a first machine learning model configured to predict the first yield value using data values obtained from parametric testing of a semiconductor wafer on which the first plurality of die are formed, each of the first plurality of die having data values for each of a plurality of parameters in the first identified parameter group;
  assign each of the first predicted yield values to respective ones of the first plurality of die;
  predict a second yield value for each of the first plurality of die in the first parameter group using a second machine learning model configured to predict respective second yield values using a location of corresponding ones of the first plurality of die;
  determine a prediction delta for each of the first plurality of die by subtracting respective predicted second yield values from respective predicted first yield values;
  establish a threshold for acceptable die loss based on a relationship between the respective predicted first yield values and respective prediction deltas; and
  remove a portion of the first plurality of die from further processing in accordance with the threshold for acceptable die loss.

* * * * *